United States Patent
Lee

(10) Patent No.: US 9,168,617 B2
(45) Date of Patent: Oct. 27, 2015

(54) MOLD FOR HOT STAMPING AND METHOD OF MANUFACTURING THE SAME

(75) Inventor: Seung Sang Lee, Busan (KR)

(73) Assignee: Hyundai Motor Company, Seoul (KR)

( * ) Notice: Subject to any disclaimer, the term of this patent is extended or adjusted under 35 U.S.C. 154(b) by 543 days.

(21) Appl. No.: 13/533,245

(22) Filed: Jun. 26, 2012

(65) Prior Publication Data

US 2013/0145809 A1   Jun. 13, 2013

(30) Foreign Application Priority Data

Dec. 7, 2011  (KR) .................. 10-2011-0130512

(51) Int. Cl.
| | |
|---|---|
| *B22C 9/00* | (2006.01) |
| *B23P 15/24* | (2006.01) |
| *B21D 37/20* | (2006.01) |
| *C21D 8/00* | (2006.01) |

(52) U.S. Cl.
CPC .............. *B23P 15/24* (2013.01); *B21D 37/20* (2013.01); *C21D 8/00* (2013.01)

(58) Field of Classification Search
CPC .................................. B22C 9/00; B23P 15/24
USPC ............................................................ 164/6
See application file for complete search history.

(56) References Cited

U.S. PATENT DOCUMENTS

2009/0320547 A1   12/2009   Horton et al.

FOREIGN PATENT DOCUMENTS

| CN | 101288890 A | 10/2008 |
|---|---|---|
| CN | 201371200 Y | 12/2009 |
| CN | 101716629 A | 6/2010 |
| JP | 05042543 A | 2/1993 |
| JP | 07308945 A | 11/1995 |
| KR | 10-2000-0027103 A | 5/2000 |
| KR | 10-0907266 | 7/2009 |
| KR | 10-2010-0037854 A | 4/2010 |
| KR | 10-2011-0056888 A | 5/2011 |
| KR | 10-2011-0073998 A | 6/2011 |
| KR | 10-2011-0081705 A | 7/2011 |

*Primary Examiner* — Kevin P Kerns
(74) *Attorney, Agent, or Firm* — Mintz Levin Cohn Ferris Glovsky and Popeo, P.C.; Peter F. Corless

(57) ABSTRACT

A mold for hot stamping is disclosed. The mold may include: a base plate configured to receive and exhaust coolant, at least one lower mold and at least one upper mold. The at least one lower mold may be mounted at a surface of the base plate, and configured to receive the coolant from the base plate. The lower mold may also have the same shape as a lower shape of a product so as to form the lower shape of the product during hot stamping. The upper mold is made of material different from that of the lower mold, coupled to an upper portion of the lower mold, has the same shape as an upper shape of the product so as to form the upper shape of the product, and is configured to receive the coolant from the lower mold such that the coolant flows in the upper mold.

2 Claims, 5 Drawing Sheets

MOLD FOR HOT STAMPING AND METHOD OF MANUFACTURING THE SAME

CROSS-REFERENCE TO RELATED APPLICATION

This application claims priority to and the benefit of Korean Patent Application No. 10-2011-0130512 filed in the Korean Intellectual Property Office on Dec. 7, 2011, the entire contents of which are incorporated herein by reference.

BACKGROUND OF THE INVENTION (a) Field of the Invention

The present invention relates to a mold for hot stamping and a method of manufacturing the same. More particularly, the present invention relates to a mold for hot stamping and a method of manufacturing the same that can improve cooling speed and cooling performance by flowing coolant smoothly during hot stamping where a super high strength product is manufactured at a high temperature.

(b) Description of the Related Art

Generally, molds are divided into injection molds for manufacturing plastic products, press molds for manufacturing products by using steel plates, and die casting molds for manufacturing products by melting metals and injecting the molten metal into the die casting molds. Typically, such molds include a movable mold and a fixed mold so as to manufacture the products without a hitch. Particularly, as use of the molds for manufacturing the products used in a vehicle increases, the molds as well as the products must technologically progress with new design needs.

Recently, improving collision performance and securing safety have become one of the main concerns of the vehicle manufacturing industry. As a result, vehicle manufacturing companies have begun to use transformation induced plasticity (TRIP) steel, dual phase (DP) steel, aluminum alloy steel, and magnesium alloy steel or conduct investigation into new technologies such as tailed welding blank (TWB), hydroforming, hot stamping so on to lighten and strengthen a vehicle body.

Herein, the hot stamping is a process for forming a panel at a high temperature to lighten the weight and to maintain strength of the vehicle body during manufacturing. After a material is heated to the high temperature, the material is pressed and a mold itself is cooled to manufacture high strength products according to the hot stamping.

The hot stamping process includes heating a blank to a temperature greater than an Ac3 transformation point so as to austenitize the blank completely. The blank is formed and quickly cooled in the mold to transform the blank into high strength martensite.

The components of the vehicle body manufactured by the hot stamping have tensile strength greater than or equal to 1500 MPa. Therefore, collision performance of the vehicle may be improved and a high degree of safety may be provided to its occupants.

In order to supply coolant into the mold used in a conventional hot stamping process, coolant apertures configured to receive the flow the coolant are directly formed at the mold. In this configuration, however, it is very difficult to form the coolant apertures in the mold for manufacturing products of complex shapes and thus a large amount time is necessary for forming these coolant apertures in the mold.

When a number of the coolant apertures are formed in the mold to cool the mold quickly, the strength of the mold may be deteriorated in the conventional hot stamping method.

Therefore, cracks or damage may occur in the mold due to contraction or deformation of the mold when the temperature of the mold changes quickly. Thus, the coolant flowing in the mold may as a result leak.

Since design, manufacture, and verification of coolant flow lines in the mold is achieved based on an actual model, initial investment and time for developing the products may increase. Therefore, an optimal cooling method for the mold should be developed at a design step of new products.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mold for hot stamping and a method of manufacturing the same having advantages of prompting flow of coolant and enhancing heat transfer so as to quickly cool a panel when manufacturing the panel by the hot stamping.

A mold for hot stamping according to an exemplary embodiment of the present invention may include: a base plate configured to receive and exhaust coolant; at least one lower mold mounted at a surface of the base plate, configured to receive the coolant from the base plate, and having the same shape as a lower shape of a product so as to form the lower shape of the product, the coolant flowing in the lower mold. An upper mold is made of material different from that of the lower mold, and is coupled to an upper portion of the lower mold, having the same shape as an upper shape of the product so as to form the upper shape of the product, The upper mold is configured to receive the coolant from the lower mold so that the coolant flows in the upper mold.

The lower mold and the upper mold may be coupled by diffusion jointing. The lower mold may have an inflow aperture and an exhaust aperture fluidly communicating an upper surface thereof with a lower surface thereof, and the lower mold may receive the coolant from the base plate through the inflow aperture and may exhaust the coolant to the base plate through the exhaust aperture.

The lower mold may include at least one storing recess formed at an upper surface of the lower mold and connected to the inflow aperture and/or the exhaust aperture to store the coolant therein. The upper mold may include at least one coolant flowing groove formed at a lower surface of the upper mold along the width direction of the upper mold.

The plurality of coolant flowing grooves may be disposed apart from each other e.g., a predetermined intervals) along a length direction of the upper mold by a predetermined distance. The lower mold may be made of hot die steel. The upper mold may be made of die steel of a high heat transfer coefficient. The lower mold and the upper mold, in a state of being assembled with each other, may be worked so as to have the same shape as that of the product.

A method of manufacturing a mold for hot stamping according to another exemplary embodiment of the present invention may include: preparing a lower mold and an upper mold with different materials; working insides of the lower mold and the upper mold; performing diffusion jointing of the lower mold and the upper mold after disposing the upper mold on the lower mold; rough grinding appearances of the assembled lower mold and the upper mold; heat-treating the assembled lower mold and the upper mold; assembling the heat-treated lower mold and the upper mold to a base plate; and finishing the appearances of the lower mold and the upper mold assembled to the base plate. The diffusion jointing of the lower mold and the upper mold may be performed in a vacuum.

Working the insides of the lower mold and the upper mold may include forming an inflow aperture and an exhaust aperture fluidly communicating upper and lower surfaces of the lower mold at the lower mold. Working the insides of the lower mold and the upper mold may further include forming at least one storing recess connected to the inflow aperture and/or the exhaust aperture at an upper surface of the lower mold and forming at least one coolant flowing groove at a lower surface of the upper mold along a width direction of the upper mold.

DESCRIPTION OF SYMBOLS

Figure 1:
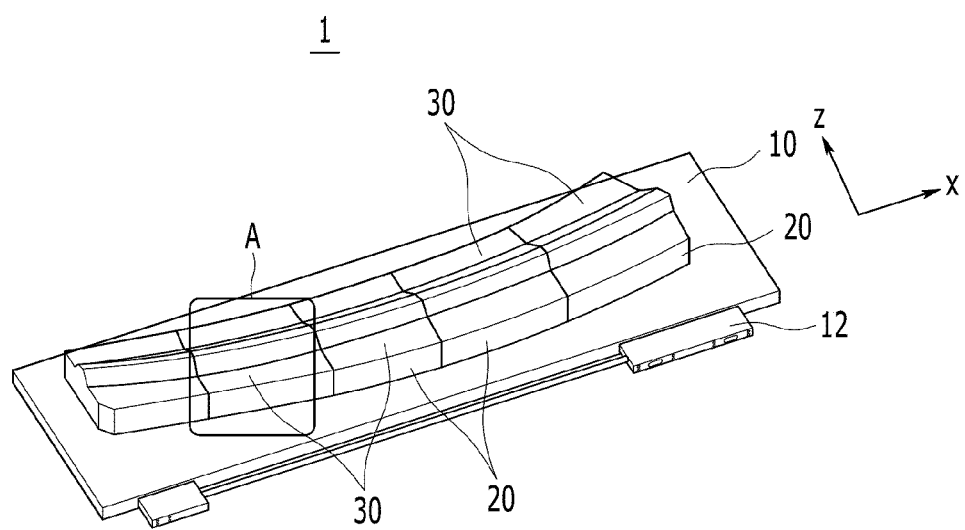
FIG. 1 is a perspective view of a mold for hot stamping according to an exemplary embodiment of the present invention.

10: base plate
12: nipple
20: lower mold
22: inflow aperture
24: exhaust aperture
26: storing recess
30: upper mold
32: coolant flowing groove

DETAILED DESCRIPTION OF THE EMBODIMENTS

An exemplary embodiment of the present invention will hereinafter be described in detail with reference to the accompanying drawings.

Exemplary embodiments described in this specification and drawings are just exemplary embodiments of the present invention. It is to be understood that there can be various modifications and equivalents included in the spirit of the present invention at the filing of this application.

Figure 2:
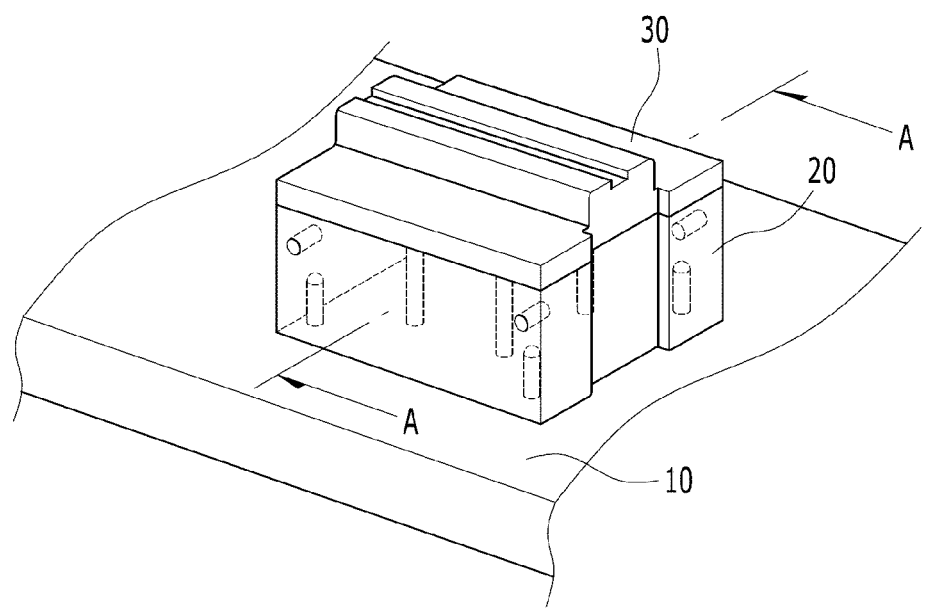
FIG. 2 is an enlarged perspective view of "A" portion in FIG. 1.
Figure 3:
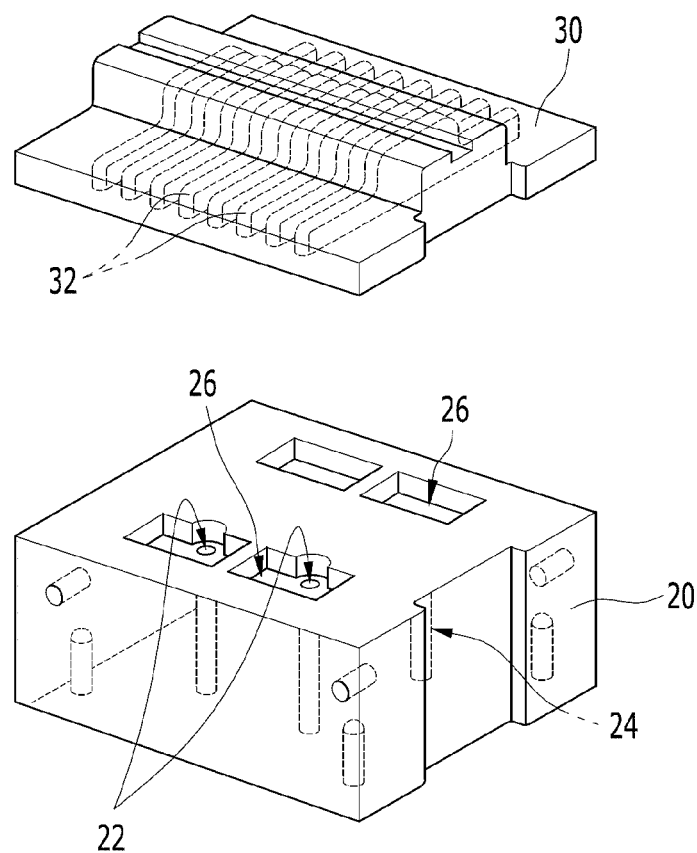
FIG. 3 is an exploded perspective view of a mold for hot stamping according to an exemplary embodiment of the present invention.
Figure 4:
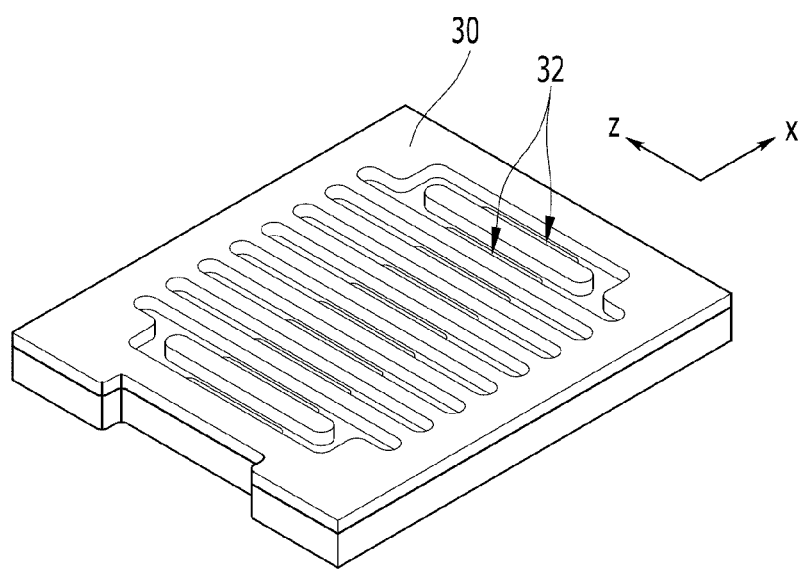
FIG. 4 is a bottom perspective view of an upper mold applied to a mold for hot stamping according to an exemplary embodiment of the present invention.

FIG. 1 is a perspective view of a mold for hot stamping according to an exemplary embodiment of the present invention; FIG. 2 is an enlarged perspective view of "A" portion in FIG. 1; FIG. 3 is an exploded perspective view of a mold for hot stamping according to an exemplary embodiment of the present invention; and FIG. 4 is a bottom perspective view of an upper mold applied to a mold for hot stamping according to an exemplary embodiment of the present invention.

Referring to the drawings, a mold 1 for hot stamping according to an exemplary embodiment of the present invention is configured to entice flow of coolant and enhance heat transfer so as to quickly cool a panel when manufacturing the panel by the hot stamping. For these purposes, the mold 1 for hot stamping according to an exemplary embodiment of the present invention, as shown in FIG. 1 to FIG. 3, includes a base plate 10, a lower mold 20 and an upper mold 30, and each element will be described in detail.

A nipple 12 is mounted on at least one side of the base plate 10. The nipple 12 is configured to supply the coolant to the base plate 10 and exhaust the coolant from the base plate 10. Coolant lines (not shown) connected to the nipple 12 are formed in the base plate 10. Therefore, the coolant flowing into the base plate 10 through the nipple 12 circulates along and through the coolant lines according to the coolant flow path. After that, the coolant is exhausted through the nipple 12.

According to the present exemplary embodiment, at least one lower mold 20 is mounted on a surface of the base plate 10. The coolant is supplied in the lower mold 20, and the lower mold 20 has the same shape as a lower shape of the product so as to form the lower shaped of the product during the hot stamping. That is, at least one lower mold 20 is mounted along a lengthwise direction X of the base plate 10 according to the shape of the product.

Herein, at least one inflow aperture 22 and one exhaust aperture 24 is formed at the lower mold 20, respectively. The inflow aperture 22 and the exhaust aperture 24 fluidly communicate an upper surface of the lower mold 20 with a lower surface of the lower mold 20. The coolant flows from the base plate 10 to the lower mold 20 through the inflow aperture 22 and is exhausted from the lower mold 20 to the base plate 10 through the exhaust aperture 24.

In addition, the upper surface of the lower mold 20 is coupled to a lower surface of the upper mold 30. At least one storing recess 26 is formed at the upper surface of the lower mold 20. The storing recess 26 is connected to the inflow aperture 22 and/or the exhaust aperture 24 so as to store the coolant therein. That is, the storing recess 26 temporarily stores the coolant that flows therein from the base plate 10 through the inflow aperture 22 or is exhausted to the base plate 10 through the exhaust aperture 24.

The coolant flowing into the lower mold 20 is stored in the storing recess 26 connected to the inflow aperture 22 among the storing recesses 26, and the coolant that will be exhausted through the base plate 10 is stored in the storing recess 26 connected to the exhaust aperture 24 among the storing recesses 26. Therefore, the storing recess 26 prevents flow of the coolant into the upper mold 30 from being cut off.

In addition, material of the upper mold 30 may be preferably different from that of the lower mold 20, and the upper mold 30 may be coupled to an upper portion of the lower mold 20. The upper mold 30 preferably has the same shape as an upper shape of the product so as to form the upper shape of the product. The coolant may be supplied into the upper mold 30 through the base plate 10 and the lower mold 20 to quickly cool the product to which the hot stamping is performed.

Herein, at least one coolant flowing groove 32, as shown in FIG. 4, is formed at the lower surface of the upper mold 30 along a width direction Z such that the coolant flows along the coolant flowing groove 32. The neighboring coolant flowing grooves 32 are disposed apart from each other along a length direction X of the upper mold 30 at a predetermined even or uneven intervals. It is disclosed, but is not limited, in the present exemplary embodiment that a plurality of coolant flowing grooves 32 is formed at even distance.

The coolant supplied from the lower mold 10 to the coolant flowing groove 32 flows in the coolant flowing groove 32 and cools the upper mold 30. Therefore, the product to which the hot stamping is performed is cooled quickly.

In one or more exemplary embodiments, material of the lower mold 20 may be hot die steel. More specifically, in one or more exemplary embodiments, the material of the lower mold 20 may be SKD 61 (Steel Kouku Dies 61) die tool steel. In addition, material of the upper mold 30 may be die steel with a high heat transfer coefficient which a greater heat transfer coefficient than that of the lower mold 20 material has.

The lower mold 20 and the upper mold 30 may be configured to respond to temperature difference in parts of the product during hot stamping. That is, the upper mold 30 made of e.g., die steel of high heat transfer coefficient is positioned at the upper portion of the product having a greater temperature, and the lower mold 20 made of hot die steel is positioned at the lower portion of the product having relatively lower temperature.

After that, since the coolant flows in the assembled lower mold 20 and the lower mold 20, the upper mold 30 having a greater heat transfer coefficient can quickly cool the upper portion of the product having high temperature by heat exchange therebetween. Therefore, the product can be cooled more efficiently and cooling time may be shortened.

Herein, the lower mold 20 and the upper mold 30 are coupled by diffusion jointing. According to the diffusion jointing, molds (or parent materials) of different materials are closely contacted and pressure that does not cause plastic deformation is applied to the molds under melting points of the molds so that atoms are diffused between jointing surfaces of the molds and the molds are assembled.

Since additional welding metal or insertion material is not necessary for joining the two surfaces of the molds assembled by the diffusion jointing and jointing portions are formed uniformly, defects of the assembled molds such as crack and pore may thus be prevented. In addition, physical and chemical properties of the molds can be maintained and materials having largely different melting points can be assembled according to the diffusion jointing. Therefore, different materials that cannot be assembled according to a conventional welding can be assembled. Finally, when the lower mold 20 and the upper mold 30 are assembled by diffusion jointing they have a stronger bonding strength and reliability may be improved. The diffusion jointing is well known to a person skilled in the art, and detailed description thereof will be omitted.

According to the present exemplary embodiment, the lower mold 20 and the upper mold 30 are worked so as to have the same shape as that of the product when the lower mold 20 and the upper mold 30 are assembled with each other.

A method of manufacturing the mold 1 for hot stamping will be described in detail, referring to FIG. 5.

Figure 5:
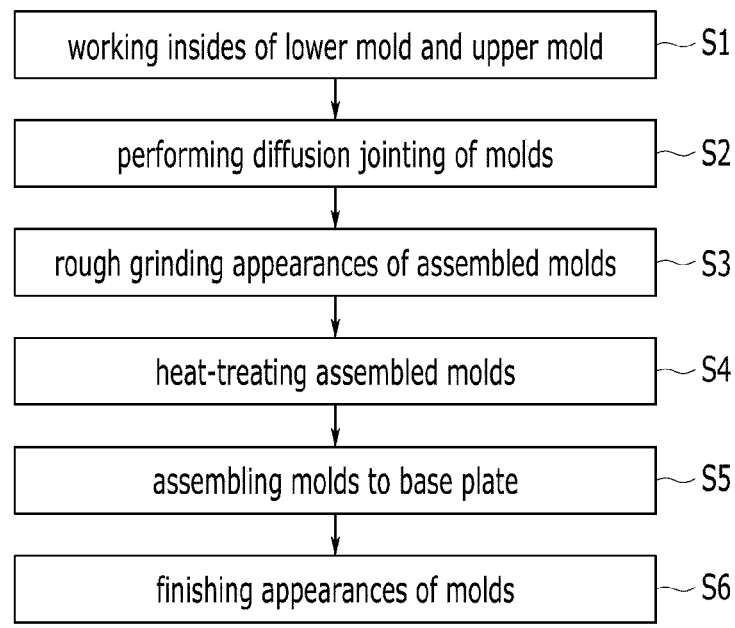
FIG. 5 is a flowchart of a method of manufacturing a mold for hot stamping according to an exemplary embodiment of the present invention.

FIG. 5 is a flowchart of a method of manufacturing a mold for hot stamping according to an exemplary embodiment of the present invention. After the lower mold 20 (e.g., made of hot die steel) and the upper mold 30 (e.g., made of die steel having a greater heat transfer coefficient than the material of the lower mold) are prepared, insides of the lower mold 20 and the upper mold 30 are worked at step S1. Herein, the lower mold 20 is made of hot die steel, and the inflow aperture 22 for flowing the coolant therein and the exhaust aperture 24 for exhausting the coolant are formed in the lower mold 20. However, the present invention is not limited thereby.

After that, the storing recesses 26 connected to the inflow aperture 22 and/or the exhaust aperture 24 are formed at the upper surface of the lower mold 20. The coolant flowing into the lower mold 20 is temporarily stored in the storing recess 26.

In addition, a plurality of coolant flowing grooves 32 are formed at the lower surface of the upper mold 30 along the length direction by the predetermined distance. The coolant flows in the upper mold 30 through the plurality of coolant flowing grooves 32. The step S1 of working the insides of the molds is completed by forming the inflow aperture 22, the exhaust aperture 24 and the storing recess 26 at the lower mold 20 and forming the coolant flowing groove 32 at the upper mold 30.

When the step S1 is completed, the upper mold 10 may be disposed on the lower mold 20. After that, pressure may be applied to the lower mold 20 and the upper mold 30 under melting points of the molds 20 and 30 to perform diffusion jointing at step S2.

Herein, diffusion jointing S2 of the lower mold 20 and the upper mold 30 may be performed in a vacuum. The diffusion jointing may be performed by applying a pressure that does not cause plastic deformation to the molds 20 and 30 under the melting points in a state that the molds 20 and 30 are contacted with each other.

A diffusion layer as a result is formed between contacting surfaces of the lower mold 20 and the upper mold 30 and the lower mold 20 and the upper mold 30 are affixed to each other as a result. When diffusion jointing S2 of the lower mold 20 and the upper mold 30 is completed, appearances of the lower mold 20 and the upper mold 30 are grinded roughly so that shapes of the lower mold 20 and the upper mold are closely similar to that of the product manufactured by the hot stamping at step S3.

When the appearances of the lower mold 20 and the upper mold 30 are grinded roughly at the step S3, the lower mold 20 and the upper mold 30 are heat-treated at step S4. When heat treatment is completed at the step S4, the lower mold 20 and the upper mold 30 are assembled to the base plate 10 at step S5. After that, the appearances of the lower mold 20 and the upper mold 30 are finished so that the shapes of the lower mold 20 and the upper mold are the same as that of the product at step S6.

The mold 1 for hot stamping according to an exemplary embodiment of the present invention may be manufactured through the steps S1 to S6. That is, the lower mold 20 and the upper mold 30 may be manufactured by using materials having different heat transfer coefficients, and coolant lines may be formed at the lower mold 20 and the upper mold 30 respectively. After that, the lower mold 20 and the upper mold 30 may be assembled by diffusion jointing to manufacture the mold 1 for hot stamping. Therefore, bonding force and degree of freedom in design may be improved, and cooling performance of the molds, that is a major factor of the hot stamping, may be enhanced.

The mold 1 for hot stamping according to an exemplary embodiment of the present invention advantageously prompts efficient flow of coolant and enhanced heat transfer to quickly cool a product when manufacturing a product (e.g., a panel) by the hot stamping.

In addition, deformation and cracking occurring at the mold when the mold is cooled is prevented in advance. Therefore, durability may be improved. In addition, a flawless product may be manufactured and productivity may be improved by achieving uniform cooling of the panel through a plurality of coolant flowing grooves 32. In addition, cooling speed may be increased.

Since the lower mold 20 and the upper mold 30 are assembled after the coolant lines are formed respectively at the lower mold 20 and the upper mold 30. Manufacturability may be improved. Also, since the lower mold 20 and the upper mold 30 made of different materials are affixed by the diffusion jointing, the bonding force between the molds 20 and 30 and reliability may be improved and manufacturing cost may be lowered.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a mold for hot stamping, comprising:

preparing a lower mold and an upper mold with different materials;

working insides of the lower mold and the upper mold comprises forming an inflow aperture and an exhaust aperture to fluidly communicate upper and lower surfaces of the lower mold at the lower mold, forming at least one storing recess connected to the inflow aperture and/or the exhaust aperture at the upper surface of the lower mold and forming at least one coolant flowing groove at a lower surface of the upper mold along a width direction of the upper mold;

performing diffusion jointing to assemble the lower mold and the upper mold together after disposing the upper mold on the lower mold corresponding to a shape of a product;

rough grinding appearances of the assembled lower mold and the upper mold to resemble the product being manufactured;

heat-treating the assembled lower mold and the upper mold;

assembling the heat-treated lower mold and the upper mold to a base plate; and finishing appearances of the lower mold and the upper mold assembled to the base plate to resemble the same shape as the product being manufactured.

2. The method of claim 1, wherein the diffusion jointing of the lower mold and the upper mold is performed in a vacuum.

* * * * *